(12) United States Patent
Kaneko et al.

(10) Patent No.: US 11,267,345 B2
(45) Date of Patent: Mar. 8, 2022

(54) CONTROL APPARATUS, CONTROL METHOD, AND CONTROL SYSTEM FOR ELECTRIC VEHICLE

(71) Applicant: Hitachi Automotive Systems, Ltd., Hitachinaka (JP)

(72) Inventors: Satoshi Kaneko, Atsugi (JP); Keisuke Suzuki, Kawasaki (JP)

(73) Assignee: Hitachi Astemo, Ltd., Hitachinaka (JP)

(*) Notice: Subject to any disclaimer, the term of this patent is extended or adjusted under 35 U.S.C. 154(b) by 215 days.

(21) Appl. No.: 16/330,786

(22) PCT Filed: Sep. 4, 2017

(86) PCT No.: PCT/JP2017/031704
§ 371 (c)(1),
(2) Date: Mar. 6, 2019

(87) PCT Pub. No.: WO2018/056028
PCT Pub. Date: Mar. 29, 2018

(65) Prior Publication Data
US 2019/0193577 A1 Jun. 27, 2019

(30) Foreign Application Priority Data

Sep. 23, 2016 (JP) .............................. JP2016-185106

(51) Int. Cl.
*B60T 8/1764* (2006.01)
*B60L 15/20* (2006.01)
(Continued)

(52) U.S. Cl.
CPC ................ *B60L 15/20* (2013.01); *B60K 6/52* (2013.01); *B60K 17/356* (2013.01);
(Continued)

(58) Field of Classification Search
CPC ................ B60L 15/20; B60L 2220/42; B60L 2240/423; B60L 2240/647; B60L 3/106;
(Continued)

(56) References Cited

U.S. PATENT DOCUMENTS 5,130,929 A * 7/1992 Shiraishi ................. B60T 8/175
180/197
5,757,714 A * 5/1998 Choi et al. ............. G11C 5/143
365/226
(Continued)

FOREIGN PATENT DOCUMENTS

EP 2 479 076 A1 7/2012
JP 3196526 B2 8/2001
(Continued)

OTHER PUBLICATIONS

International Search Report (PCT/ISA/210) issued in PCT Application No. PCT/JP2017/031704 dated Nov. 28, 2017 with English translation (four (4) pages).
(Continued)

*Primary Examiner* — Donald J Wallace
*Assistant Examiner* — Daniel M. Robert
(74) *Attorney, Agent, or Firm* — Crowell & Moring LLP (57) ABSTRACT

Provided is a control apparatus, a control method, and a control system for an electric vehicle that can prevent or reduce an unnecessary torque fluctuation on a wheel not targeted for slip control. A control apparatus for an electric vehicle limits a torque to be output to a non-target wheel according to a torque output to a target wheel after target wheel slip control is started, and updates a limit value of the torque to be output to the non-target wheel when a fluctuation range of the torque output to the target wheel falls within a predetermined range during the limitation.

9 Claims, 9 Drawing Sheets

(51) Int. Cl.
*B60T 8/175* (2006.01)
*B60T 8/1769* (2006.01)
*B60T 8/1766* (2006.01)
*B60L 3/10* (2006.01)
*B60K 6/52* (2007.10)
*B60K 17/356* (2006.01)
*B60K 23/08* (2006.01)

(52) U.S. Cl.
CPC .......... *B60K 23/0808* (2013.01); *B60L 3/106* (2013.01); *B60T 8/175* (2013.01); *B60T 8/1764* (2013.01); *B60T 8/1766* (2013.01); *B60T 8/1769* (2013.01); *B60L 2220/42* (2013.01); *B60L 2240/423* (2013.01); *B60L 2240/465* (2013.01); *B60L 2260/28* (2013.01); *B60T 2210/12* (2013.01); *B60T 2270/20* (2013.01); *B60T 2270/202* (2013.01); *B60W 2720/403* (2013.01); *B60Y 2300/18175* (2013.01); *B60Y 2400/82* (2013.01); *Y02T 10/72* (2013.01)

(58) Field of Classification Search
CPC .......... B60L 2260/28; B60L 2240/465; B60K 6/52; B60K 17/356; B60K 23/0808; B60Y 2300/18175; B60Y 2400/82; B60T 2270/20; B60T 2210/12; B60T 8/175; B60T 8/1769; B60T 8/1764; B60T 8/1766; B60T 2270/202; B60W 2720/403; Y02T 90/16; Y02T 10/62; Y02T 10/64; Y02T 10/72
See application file for complete search history.

(56) References Cited

U.S. PATENT DOCUMENTS

| | | | | |
|---|---|---|---|---|
| 6,909,959 | B2* | 6/2005 | Hallowell | B60T 8/1769 701/88 |
| 7,739,005 | B1* | 6/2010 | Tang | B60L 15/2036 701/22 |
| 10,086,838 | B2* | 10/2018 | Flaum | B60K 7/0007 |
| 2010/0332094 | A1* | 12/2010 | Wu | B60K 23/0808 701/69 |
| 2016/0039311 | A1* | 2/2016 | Kato | B60L 15/20 701/22 |
| 2016/0089982 | A1* | 3/2016 | Ienaga | B60L 3/106 701/22 |
| 2016/0129901 | A1* | 5/2016 | Migita | B60W 10/08 701/22 |
| 2016/0152238 | A1* | 6/2016 | Mita | B60K 23/0808 180/197 |
| 2016/0229290 | A1* | 8/2016 | Chimner | B60K 23/0808 |
| 2017/0166212 | A1 | 6/2017 | Flaum et al. | |

FOREIGN PATENT DOCUMENTS

| | | | |
|---|---|---|---|
| JP | 2002-67723 A | 3/2002 | |
| JP | 3617680 B2 * | 2/2005 | ............. B60T 8/175 |
| JP | 2005-170086 A | 6/2005 | |
| JP | 2005-207953 A | 8/2005 | |
| JP | 2010-51136 A | 3/2010 | |
| JP | 2010-183835 A | 8/2010 | |
| WO | WO-2004039621 A1 * | 5/2004 | ............. B60T 8/172 |
| WO | WO 2012/086223 A1 | 6/2012 | |
| WO | WO 2015/135627 A1 | 9/2015 | |

OTHER PUBLICATIONS

Japanese-language Written Opinion (PCT/ISA/237) issued in PCT Application No. PCT/JP2017/031704 dated Nov. 28, 2017 (three (3) pages).
European Communication under Rule 71(3) EPC issued in European Application No. 17 852 807.1 dated Jun. 17, 2020 (45 pages).

* cited by examiner

CONTROL APPARATUS, CONTROL METHOD, AND CONTROL SYSTEM FOR ELECTRIC VEHICLE

TECHNICAL FIELD

The present invention relates to a control apparatus, a control method, and a control system for an electric vehicle.

BACKGROUND ART

Conventionally, there has been known the following technique. A control apparatus for an electric vehicle including an electric motor for front wheels and an electric motor for rear wheels eliminates or reduces a slip of the front wheels, and limits a torque to be output to the rear wheels according to a torque to be output to the front wheels, when the front wheels have slipped during four-wheel drive running (for example, PTL 1).

CITATION LIST

Patent Literature

[PTL 1] Japanese Patent Application Public Disclosure No. 2005-170086

SUMMARY OF INVENTION

However, the above-described conventional technique raises a problem of occurrence of an unnecessary torque fluctuation on the rear wheels because a limit value of the torque to be output to the rear wheels is constantly updated according to a change in the torque to be output to the front wheels.

An object of the present invention is to provide a control apparatus, a control method, and a control system for an electric vehicle that can prevent or reduce the unnecessary torque fluctuation on a wheel not targeted for slip control.

SOLUTION TO PROBLEM

According to one aspect of the present invention, a control apparatus for an electric vehicle limits a torque to be output to a non-target wheel according to a torque output to a target wheel targeted for slip control after the slip control is started, and updates a limit value of the torque to be output to the non-target wheel when a fluctuation range of the torque output to the target wheel falls within a predetermined range during the limitation.

Therefore, according to the one aspect of the present invention, the unnecessary torque fluctuation on the wheel not targeted for the slip control can be prevented or reduced.

DESCRIPTION OF EMBODIMENTS

First Embodiment

Figure 1:
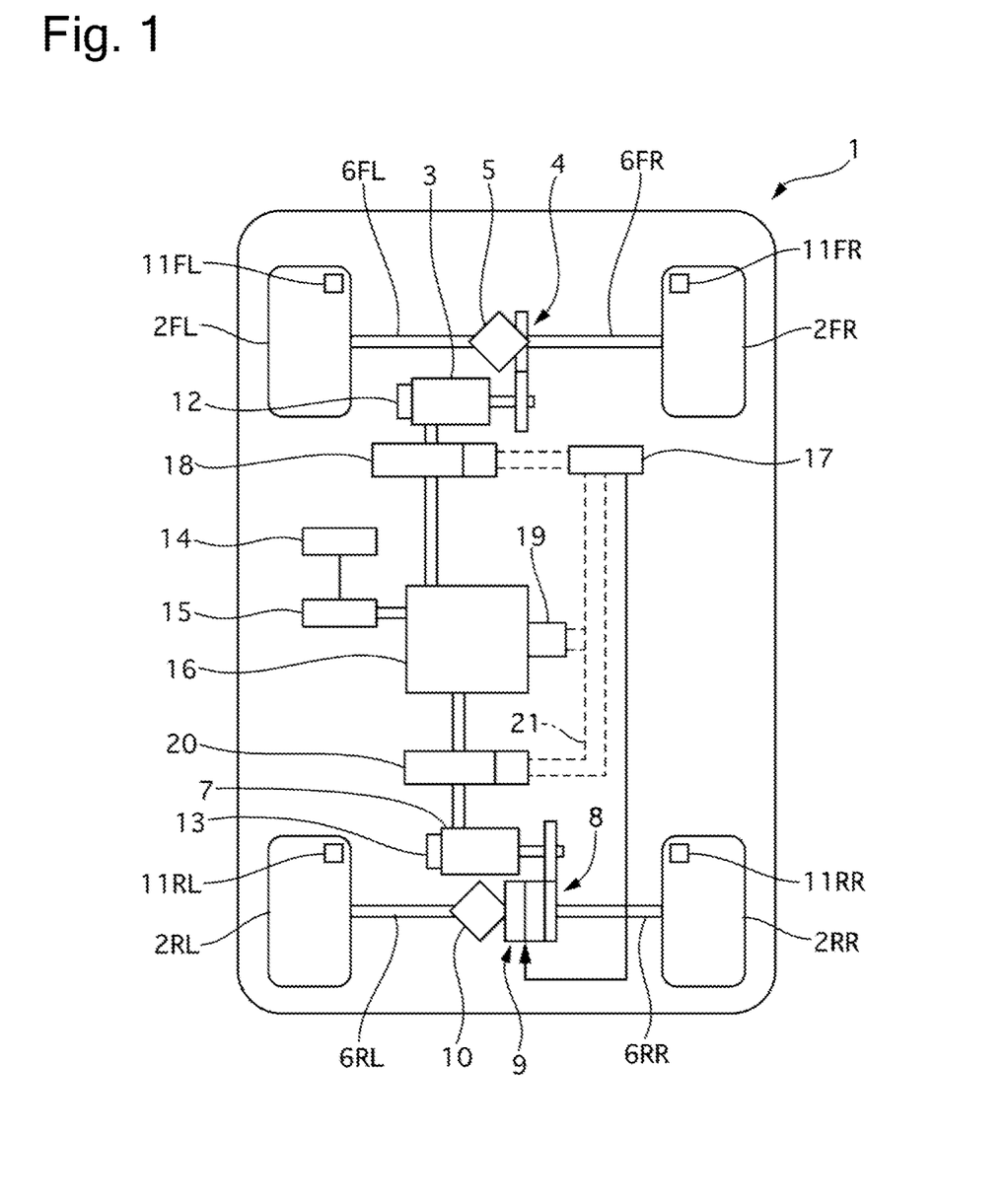
FIG. 1 illustrates a configuration of a control system of an electric vehicle according to a first embodiment.

FIG. 1 illustrates a configuration of a control system of an electric vehicle according to a first embodiment.

An electric vehicle 1 includes a front motor 3, which outputs a torque to front-side wheels (hereinafter also referred to as front wheels) 2FL and 2FR. Power is transmitted between the front motor 3 and the front wheels 2FL and 2FR via a speed reducer 4, a differential 5, and front axles 6FL and 6FR. The electric vehicle 1 includes a rear motor 7, which outputs a torque to rear-side wheels (hereinafter also referred to as rear wheels) 2RL and 2Rr. Power is transmitted between the rear motor 7 and the rear wheels 2RL and 2RR via a speed reducer 8, a dog clutch 9, a differential 10, and rear axles 6RL and 6RR. When the dog clutch 9 is connected, the power is transmitted between the rear motor 7 and the rear wheels 2RL and 2RR. On the other hand, when the dog clutch 9 is released, the power is not transmitted between the rear motor 7 and the rear wheels 2RL and 2RR. The wheels 2FL, 2FR, 2RL, and 2RR include wheel speed sensors 11FL, 11FR, 11RL, and 11RR, which detect wheel speeds, respectively. The front motor 3 includes a resolver 12, which detects the number of rotations of the motor. The rear motor 7 includes a resolver 13, which detects the number of rotations of the motor. The electric vehicle 1 includes a low-voltage battery 14 and a high-voltage battery 15. The low-voltage battery 14 is, for example, a lead battery. The high-voltage battery 15 is, for example, a lithium-ion battery or a nickel-hydride battery. The high-voltage battery 15 is charged by power with a voltage thereof boosted by a DC-DC converter 16.

The electric vehicle 1 includes a vehicle control apparatus (a control unit) 17, a front motor control apparatus 18, a rear motor control apparatus 19, and a battery control apparatus 20. Each of the control apparatuses 17, 18, 19, and 20 share information between them via a CAN bus 21. The vehicle control apparatus 17 inputs information from various kinds of sensors, and comprehensively controls the vehicle. The vehicle control apparatus 17 calculates a front requested torque that the front motor 3 should output according to requested torque distribution with respect to a requested torque according to, for example, an accelerator operation performed by a driver. A requested distribution torque is a requested value of a torque distribution ratio between the front wheels 2FL and 2FR and the rear wheels 2RL and 2RR, and is appropriately set according to a running state. Further, the vehicle control apparatus 17 calculates a rear requested torque that the rear motor 7 should output according to the requested torque distribution with respect to the requested torque. The front motor control apparatus 18 controls the power to be supplied to the front motor 3, based on the front requested torque. The rear motor control apparatus 19 controls the power to be supplied to the rear motor 7, based on the rear requested torque. The battery control apparatus 20 monitors a charged/discharged state of the high-voltage battery 15 and a battery cell forming the high-voltage battery 15. The battery control apparatus 20 calculates a battery requested torque limit value based on, for example, the charged/discharged state of the high-voltage battery 15. The battery requested torque limit value is an allowable maximum torque of each of the front motor 3 and the rear motor 7. For example, when a charged amount of the high-voltage battery 15 reduces, the battery requested torque limit value is set to a smaller value than usual.

When one of a wheel speed of the front wheels 2FL and 2FR (a front wheel speed) and a wheel speed of the rear wheels 2RL and 2RR (a rear wheel speed) exceeds a target wheel speed during four-wheel drive running, the vehicle control apparatus 17 performs slip control of eliminating or reducing a slip by controlling the torque to be output to this wheel (a target wheel). In the slip control, the motor torque is controlled in such a manner that the wheel speed of the target wheel is converged on the target wheel speed. Now, the target wheel speed is a speed acquired by adding a predetermined offset value to a vehicle speed. The vehicle speed is a speed estimated from, for example, a detection signal of an acceleration sensor mounted on the electric vehicle 1.

Further, the vehicle control apparatus 17 performs torque limit control of limiting the torque to be output to a wheel (a non-target wheel) that is not the wheel targeted for the slip control between the front wheels 2FL and 2FR and the rear wheels 2RL and 2RR, after starting the slip control. In the torque limit control according to the first embodiment, the torque of the non-target wheel is limited based on the torque output to the wheel targeted for the slip control with the aim of preventing or reducing an unnecessary torque fluctuation on the wheel not targeted for the slip control. Now, details thereof will be described.

Figure 2:
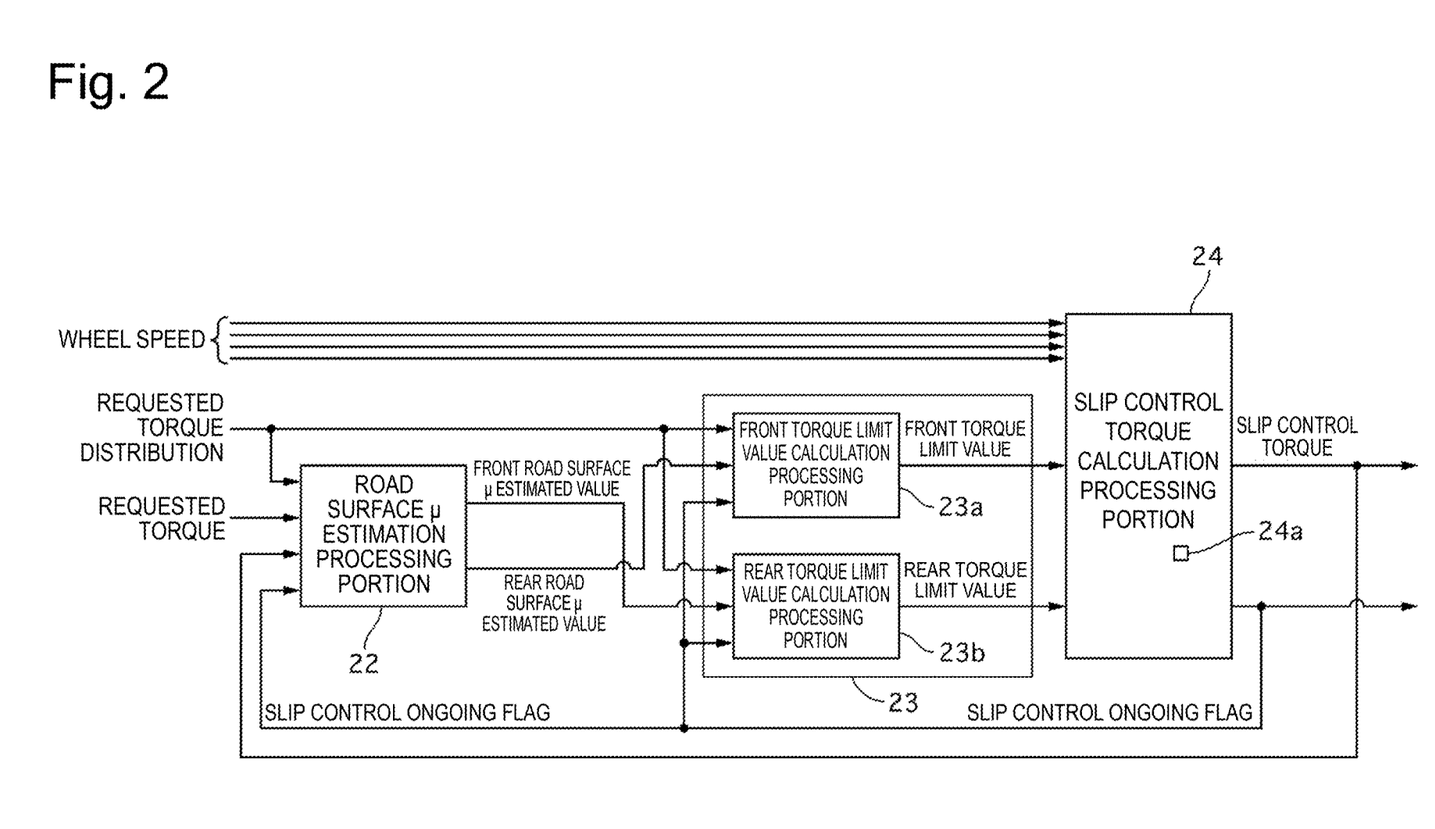
FIG. 2 is a block diagram for performing slip control and torque limit control by a vehicle control apparatus 17.

FIG. 2 is a block diagram for performing the slip control and the torque limit control by the vehicle control apparatus 17.

The vehicle control apparatus 17 includes a road surface $\mu$ estimation processing portion (a road surface $\mu$ estimated value calculation portion) 22, a torque limit value calculation processing portion (a non-target wheel torque limit control portion) 23, and a slip control torque calculation processing portion (a target wheel slip control portion and a non-target wheel sleep control portion) 24.

The road surface $\mu$ estimation processing portion 22 calculates a front road surface $\mu$ estimated value, which is a road surface frictional coefficient between the front wheels 2FL and 2FR and a road surface, and a rear road surface $\mu$ estimated value, which is a road surface frictional coefficient between the rear wheels 2RL and 2RR and the road surface, based on the requested torque and a slip control torque, when a slip control ongoing flag, which indicates that the slip control is in progress, is set. The road surface $\mu$ estimation processing portion 22 calculates the road surface $\mu$ estimated value with use of the slip control torque for the wheel targeted for the slip control and with use of the requested torque distribution for the non-target wheel. If the slip control is also started on the non-target wheel, the road surface $\mu$ estimated value is calculated with use of the slip control torque. The road surface $\mu$ estimation processing portion 22 recalculates and updates the road surface $\mu$ estimated value when a fluctuation range of the torque of the wheel targeted for the slip control falls within a predetermined range (a road surface $\mu$ estimated value calculation).

The torque limit value calculation processing portion 23 includes a front torque limit value calculation processing portion 23a and a rear torque limit value calculation processing portion 23b. The front torque limit value calculation processing portion 23a calculates a front torque limit value based on the requested torque distribution and the rear road surface $\mu$ estimated value when the slip control ongoing flag is set. The rear torque limit value calculation processing portion 23b calculates a rear torque limit value based on the requested torque distribution and the front road surface $\mu$ estimated value when the slip control ongoing flag is set. The torque limit value is updated by peak-hold. More specifically, when updating the torque limit value, the torque limit value calculation processing portion 23 compares the torque limit value calculated from the current road surface $\mu$ estimated value and the current torque limit value, and sets one of them that has a smaller absolute value as the torque limit value. Therefore, the torque limit value calculation processing portion 23 determines the torque limit value by select-low between the calculated torque limit value and the current torque limit value when the vehicle is accelerated, and determines the torque limit value by select-high between the calculated torque limit value and the current torque limit value when the vehicle is decelerated. The vehicle control apparatus 17 controls the power to be supplied to the motor on the non-target wheel side based on the front torque limit value during the torque limit control (non-target wheel torque limit control). A specific method for calculating the front torque limit value and the rear torque limit value will be described below.

The slip control torque calculation processing portion 24 monitors each wheel speed, and clears the slip control ongoing flag (=0) when both the front wheel speed and the rear wheel speed are equal to or lower than the target wheel speed. The slip control torque calculation processing portion 24 sets the slip control ongoing flag (=1) to start the slip control when one of the front wheel speed and the rear wheel speed exceeds the target wheel speed. The slip control torque calculation processing portion 24 includes a slip detection portion 24a, which sets or clears the slip control flag by comparing the front wheel speed and the rear wheel speed with the target wheel speed, i.e., detects a slip of each of the front wheels 2FL and 2FR and the rear wheels 2RL and 2RR. The slip control torque calculation processing portion 24 calculates the slip control torque for converging the wheel speed of the target wheel on the target wheel speed during the slip control. The vehicle control apparatus 17 controls, based on the slip control torque, the power to be supplied to the motor on the target wheel side during the slip control (target wheel slip control). The slip control torque calculation processing portion 24 also performs the slip control for the non-target wheel when the wheel speed of the non-target wheel exceeds the wheel speed of the target wheel or the target wheel speed during the slip control (non-target wheel slip control). At this time, the slip control torque calculation processing portion 24 calculates the slip control torque for the non-target wheel within an upper limit defined by the torque limit value calculated by the torque limit value calculation processing portion 23.

Figure 3:
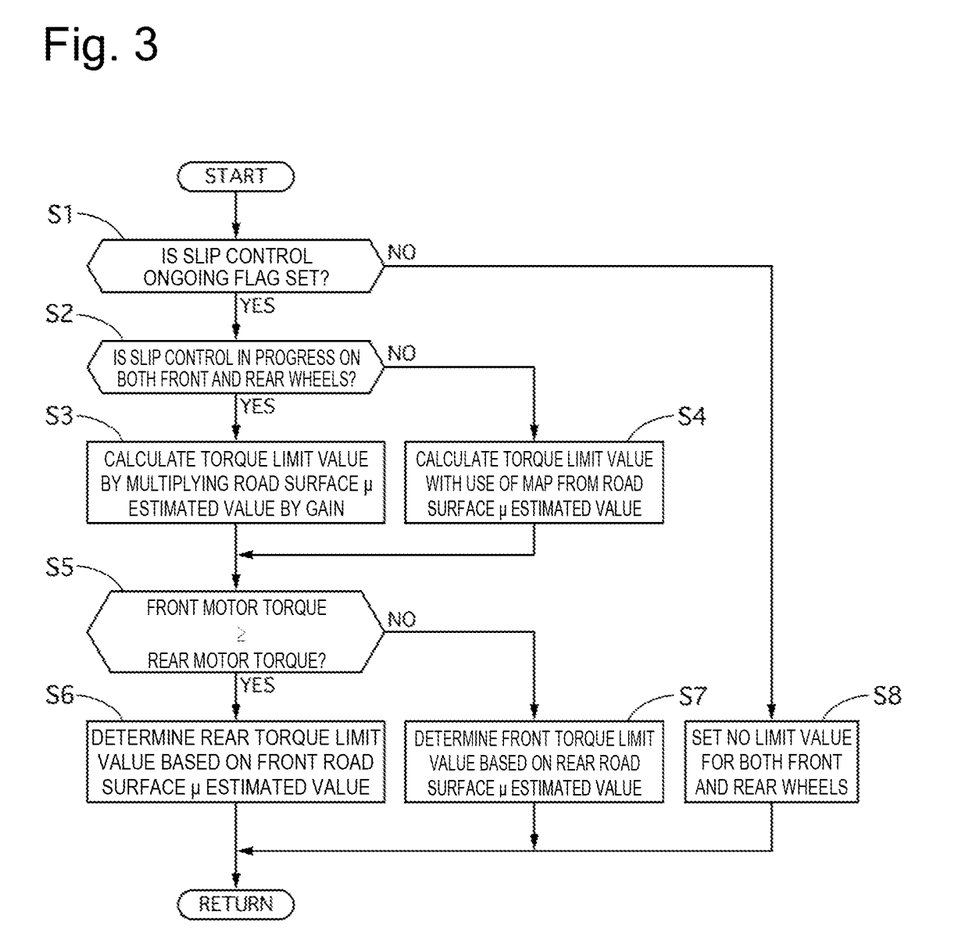
FIG. 3 is a flowchart illustrating a method for calculating a torque limit value by a torque limit value calculation processing portion 23.

FIG. 3 is a flowchart illustrating a method for calculating the torque limit value by the torque limit value calculation processing portion 23.

In step S1, the torque limit value calculation processing portion 23 determines whether the slip control ongoing flag is set. If the determination in step S1 is YES, the processing proceeds to step S2. If the determination in step S1 is NO, the processing proceeds to step S8.

In step S2, the torque limit value calculation processing portion 23 determines whether the slip control is in progress on both the front and rear wheels. If the determination in step S2 is YES, the processing proceeds to step S3. If the determination in step S2 is NO, the processing proceeds to step S4.

In step S3, the torque limit value calculation processing portion 23 selects a method that calculates the torque limit value by multiplying the road surface µ estimated value by a predetermined gain as the method for calculating the torque limit value. A smaller value is acquired as the torque limit value determined in step S3 than the torque limit value determined in step S4, which will be described below, if the road surface µ estimated value is the same.

Figure 4:
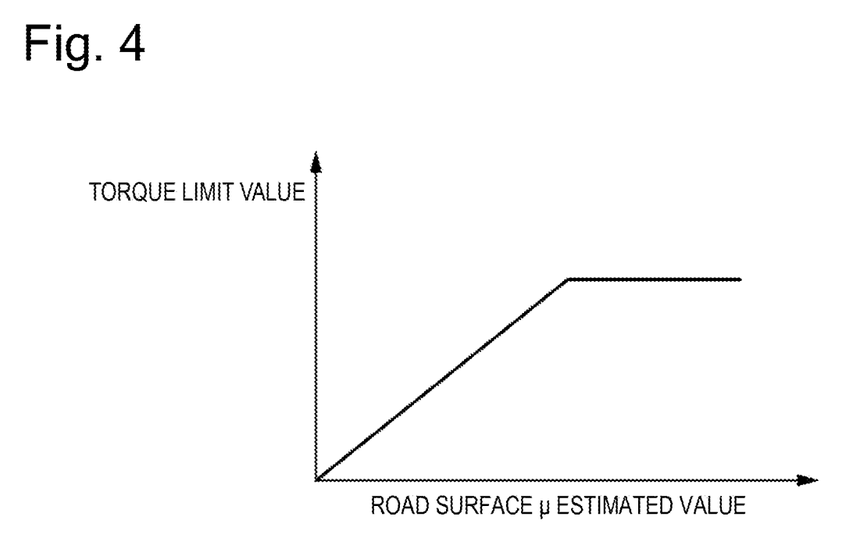
FIG. 4 illustrates a map for setting the torque limit value according to a road surface μ estimated value.

In step S4, the torque limit value calculation processing portion 23 selects a method that calculates the torque limit value by referring to a torque limit value setting map according to the road surface µ estimated value illustrated in FIG. 4 from the road surface µ estimated value as the method for calculating the torque limit value. The torque limit value setting map indicates that the torque limit value is zero when the road surface µ estimated value is zero, and is maximized when the road surface µ estimated value exceeds a predetermined value (<1.0). A value proportional to the road surface µ estimated value is acquired as the torque limit value when the road surface µ estimated value falls within a range between zero and the predetermined value.

In step S5, the torque limit value calculation processing portion 23 determines whether the front motor torque distribution is equal to or higher than the rear motor torque distribution. If the determination in step S5 is YES, the processing proceeds to step S6. If the determination in step S5 is NO, the processing proceeds to step S7.

In step S6, the torque limit value calculation processing portion 23 determines the torque limit value of the rear wheels 2RL and 2RR with use of the method selected in step S3 or step S4, based on the front road surface µ estimated value.

In step S7, the torque limit value calculation processing portion 23 determines the torque limit value of the front wheels 2FL and 2FR with use of the method selected in step S3 or step S4, based on the rear road surface µ estimated value.

In step S8, the torque limit value calculation processing portion 23 determines not to set the limit value for both the front and rear wheels.

Figure 5:
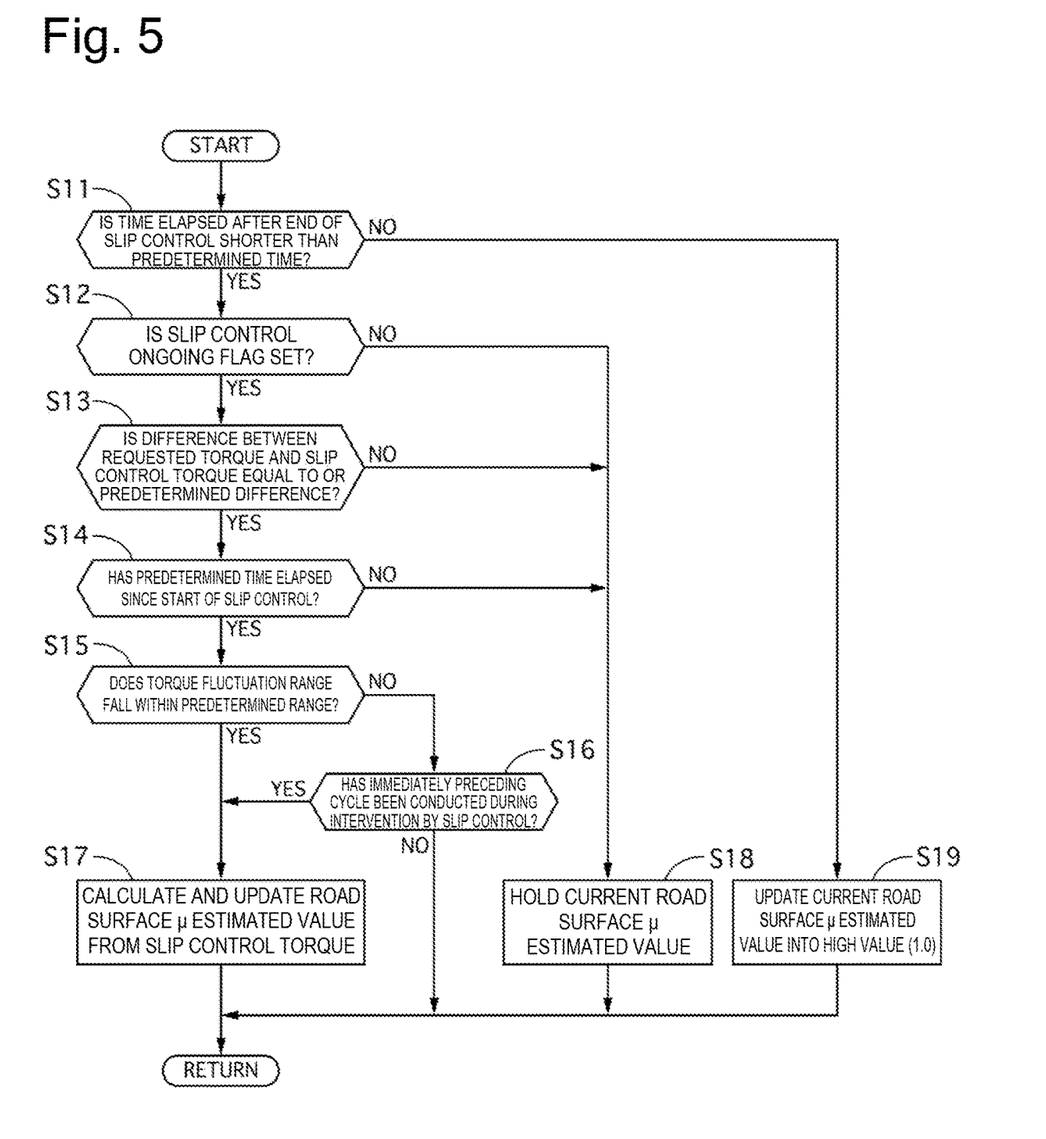
FIG. 5 is a flowchart illustrating a method for calculating and updating the road surface μ estimated value by a road surface μ estimation processing portion 22.

FIG. 4 is a flowchart illustrating a method for calculating and updating the road surface µ estimated value by the road surface µ estimation processing portion 22.

In step S11, the road surface µ estimation processing portion 22 determines whether a time elapsed after an end of the slip control is shorter than a predetermined time. If the determination in step S11 is YES, the processing proceeds to step S12. If the determination in step S11 is NO, the processing proceeds to step S19.

In step S12, the road surface µ estimation processing portion 22 determines whether the slip control ongoing flag is set. If the determination in step S12 is YES, the processing proceeds to step S13. If the determination in step S12 is NO, the processing proceeds to step S18.

In step S13, the road surface µ estimation processing portion 22 determines whether a difference between a torque instruction value according to the requested torque and the slip control torque is equal to or larger than a predetermined difference. If the determination in step S13 is YES, the processing proceeds to step S14. If the determination in step S13 is NO, the processing proceeds to step S18.

In step S14, the road surface µ estimation processing portion 22 determines whether a predetermined time has elapsed since a start of the slip control. If the determination in step S14 is YES, the processing proceeds to step S15. If the determination in step S14 is NO, the processing proceeds to step S18.

In step S15, the road surface µ estimation processing portion 22 determines whether the fluctuation range of the motor torque of the control target wheel falls within a predetermined range. If the determination in step S15 is YES, the processing proceeds to step S17. If the determination in step S15 is NO, the processing proceeds to step S16. The predetermined range is a range that allows the slip of the wheel targeted for the slip control to be determined to be sufficiently eliminated or reduced.

In step S16, the road surface µ estimation processing portion 22 determines whether an immediately preceding cycle has been conducted during intervention by the slip control. If the determination in step S16 is YES, the processing proceeds to step S17. If the determination in step S16 is NO, the processing proceeds to RETURN.

In step S17, the road surface µ estimation processing portion 22 calculates and updates the road surface µ estimated value from the slip control torque. The road surface µ estimation processing portion 22 may calculate the road surface µ estimated value from the measured torque value of the axle 6.

In step S18, the road surface µ estimation processing portion 22 holds the current road surface µ estimated value.

In step S19, the road surface µ estimation processing portion 22 updates the road surface µ estimated value into a high µ value (1.0).

Next, functions and effects of the first embodiment will be described.

Figure 6:
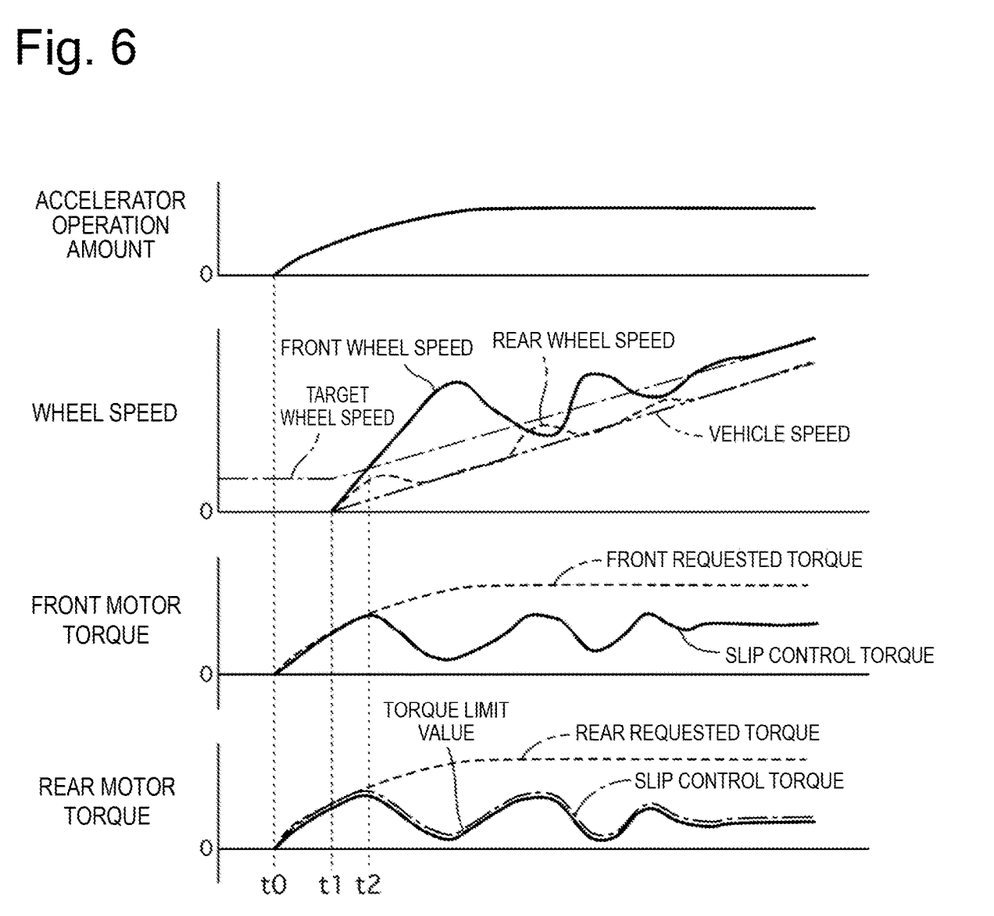
FIG. 6 is a timing chart in a case where front wheels have slipped when a vehicle has started running according to a conventional control apparatus for an electric vehicle.

FIG. 6 is a timing chart in a case where the front wheels have slipped when the vehicle has started running according to the conventional control apparatus for the electric vehicle.

At time t0, the driver starts an accelerator operation. An increase in the accelerator operation amount causes increases in the front torque instruction value and the rear torque instruction value according thereto, thereby causing generation of the front motor torque and the rear motor torque.

At time t1, the vehicle starts running, and the front wheel speed and the rear wheel speed rise.

At time t2, the front wheel speed exceeds the target wheel speed, so that the slip control is started on the front wheels and the front motor torque is controlled so as to match the slip control torque. At the same time, the torque limit control is started on the rear wheels and the rear motor torque is controlled so as to match the torque limit value. Now, the conventional control apparatus for the electric vehicle constantly updates the torque limit value according to the change in the slip control torque, thereby raising a problem of occurrence of an unnecessary torque fluctuation in the rear motor torque and thus leading to unstable torque control on the rear wheels.

Figure 7:
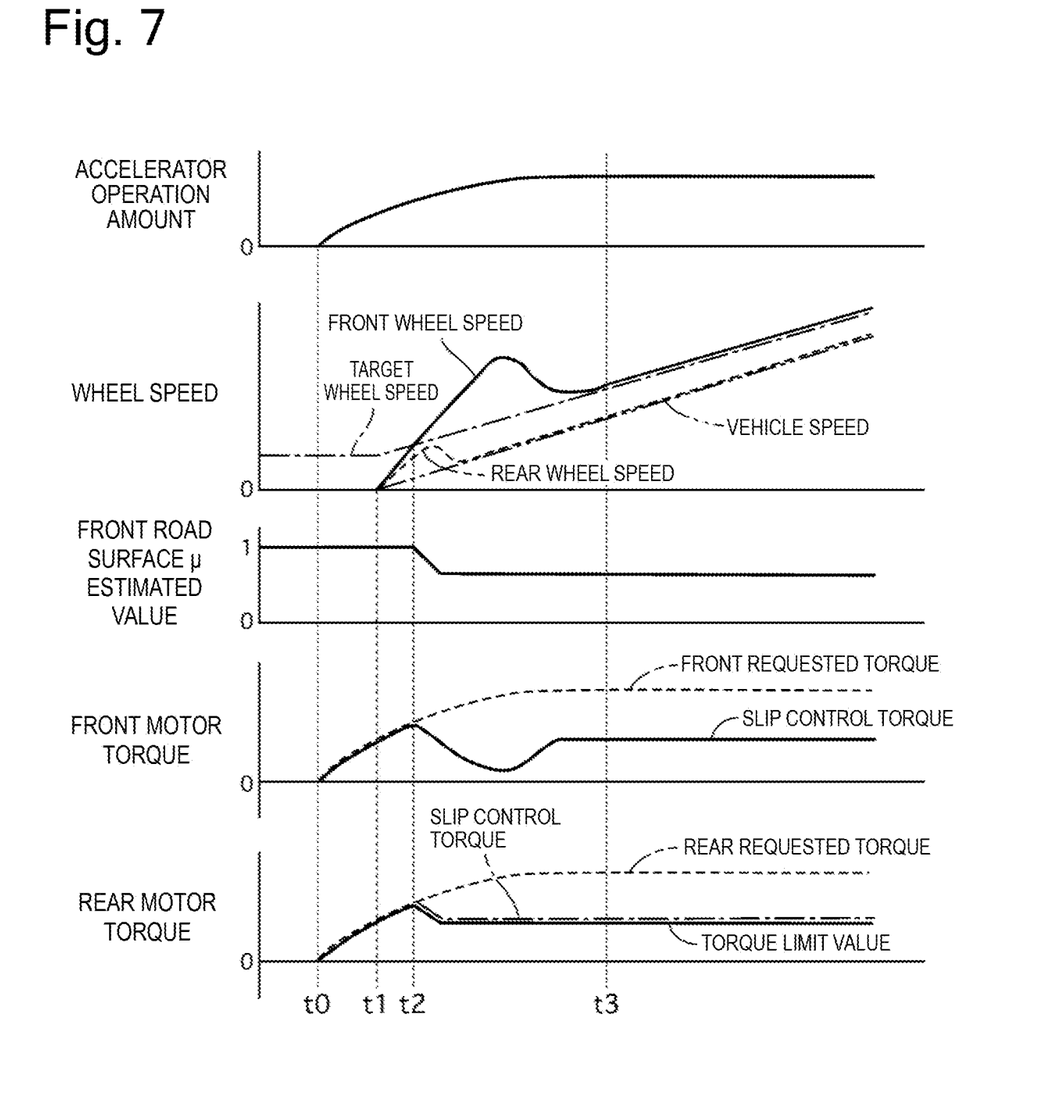
FIG. 7 is a timing chart in a case where the front wheels 2FL and 2FR have slipped when the vehicle has started running according to the first embodiment.

FIG. 7 is a timing chart in a case where the front wheels 2FL and 2FR have slipped when the vehicle has started running according to the first embodiment.

A period from time t0 to t2 is similar to the period from time t0 to time t2 illustrated in FIG. 6, and therefore a description thereof will be omitted here.

At time t2, the front wheel speed exceeds the target wheel speed, so that the slip control and the torque limit control are started on the front wheels 2FL and 2FR and the rear wheels 2RL and 2RR, respectively. At this time, the torque limit value is determined based on the front road surface μ estimated value estimated from the slip control torque at a slip control start time (t2). During a period from time t2 to time t3, the front road surface μ estimated value estimated at the slip control start time is maintained, and therefore the limit torque determined from the front road surface μ estimated value is also kept constant.

At time t3, the predetermined time has elapsed since the slip control start time (t2) and the front motor torque is converged on the target wheel speed, so that the front road surface μ estimated value is updated based on the slip control torque at time t3. The torque limit value is also updated according to the update of the front road surface μ estimated value. A smaller value is acquired as the front road surface μ estimated value estimated at time t3 than the front road surface μ estimated value estimated at time t2, so that a smaller value is acquired as the torque limit value determined at time t3 than the torque limit value determined at time t2 and the rear motor is further limited. Now, hypothetically supposing that the front road surface μ estimated value estimated at time t3 is larger than the front road surface μ estimated value estimated at time t2, the torque limit value determined at time t2 would be held (the peak-hold). Due to this control, the vehicle control apparatus 17 can be prevented from calculating an excessively large torque limit value based the front road surface μ estimated value transitionally reduced due to the slip control, thereby eliminating or reducing the slip of the rear wheels 2RL and 2RR.

In this manner, in the first embodiment, the vehicle control apparatus 17 does not update the torque limit value of the rear motor torque until the fluctuation range of the front motor torque falls within the predetermined range after starting the slip control. Due to this control, the vehicle control apparatus 17 can prevent the torque limit value from being dragged by the transitional change in the slip control torque. Therefore, the vehicle control apparatus 17 can prevent or reduce the unnecessary torque fluctuation on the rear wheels 2RL and 2RR during the slip control on the front wheels 2FL and 2FR. As a result, the vehicle control apparatus 17 can realize stable torque control on the rear wheels 2RL and 2RR.

Figure 8:
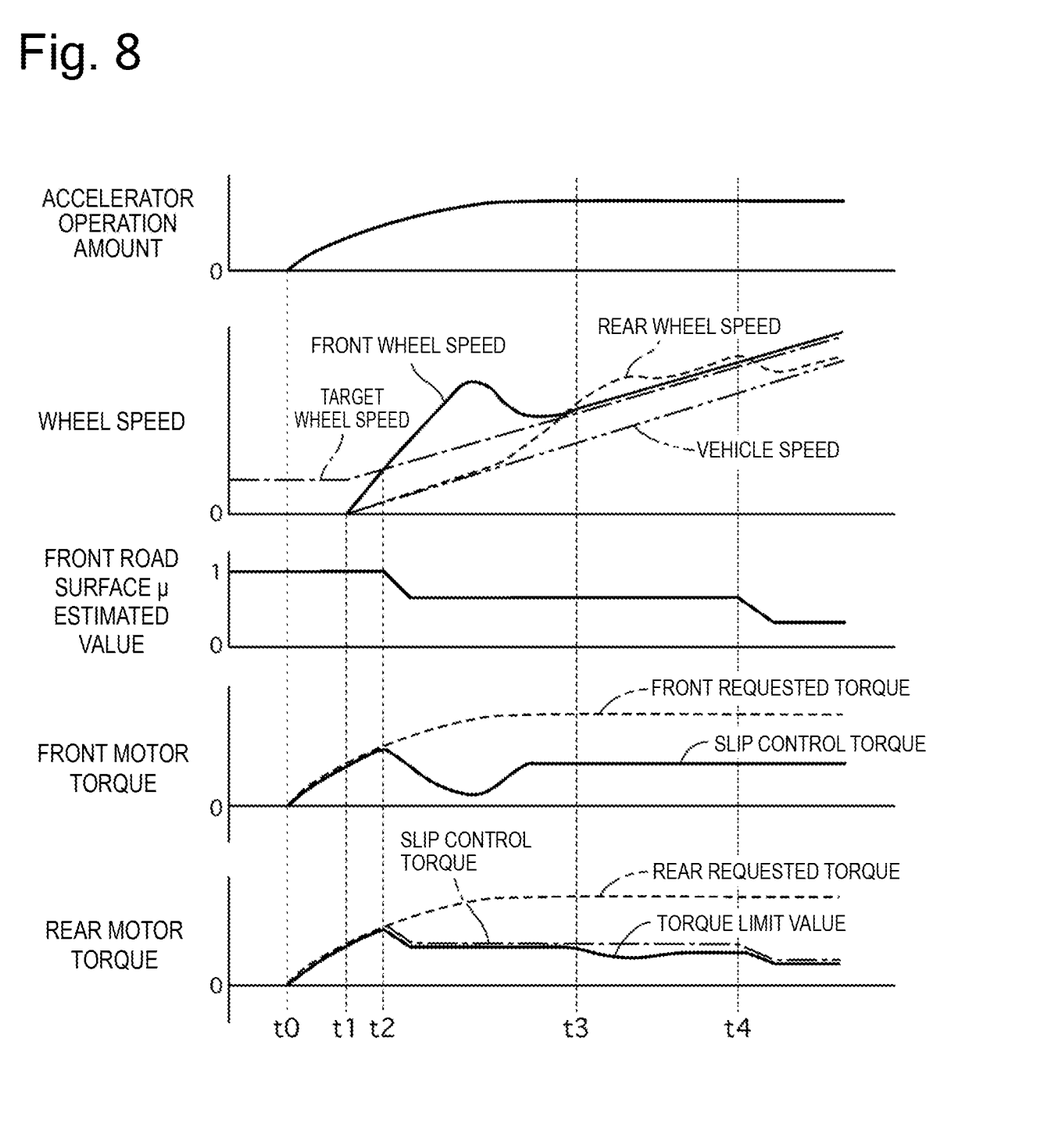
FIG. 8 is a timing chart in a case where rear wheels 2RL and 2RR have slipped after the front wheels 2FL and 2FR have slipped when the vehicle has started running according to the first embodiment.

FIG. 8 is a timing chart in a case where the rear wheels 2RL and 2RR have slipped after the front wheels 2FL and 2FR have slipped when the vehicle has started running according to the first embodiment.

A period from time t0 to t3 is similar to the period from time t0 to time t3 illustrated in FIG. 7, and therefore a description thereof will be omitted here.

At time t3, the rear wheel speed exceeds the front wheel speed (=the target wheel speed), so that the slip control is started on the rear wheels 2RL and 2RR. When the rear wheels 2RL and 2RR have slipped, also performing the slip control on the rear wheels 2RL and 2RR can prevent or reduce continuation of the slip of the rear wheels 2RL and 2RR. Now, the torque limit value of the rear wheels 2RL and 2RR is calculated before the slip control torque of the rear wheels 2RL and 2RR is calculated, and the slip control torque is limited to a value equal to or smaller than the torque limit value. Due to this control, the vehicle control apparatus 17 can avoid mutual intervention between the torque limit control and the slip control. As a result, the vehicle control apparatus 17 can prevent or reduce hunting of the torque control on the rear wheels 2RL and 2RR between the torque limit control and the slip control.

At time t4, the predetermined time has elapsed since the time of the start of the slip control on the front wheels 2FL and 2FR (t2) and the front motor torque is converged on the target wheel speed, so that the front road surface μ estimated value is updated based on the slip control torque at time t4. The torque limit value is also updated according to the update of the front road surface μ estimated value. When the slip control is in progress on both the front and rear wheels, the torque limit value is set to a smaller value than when the slip control is in progress on only the front wheels. As a result, the vehicle control apparatus 17 can prevent or reduce the continuation of the slip of the rear wheels 2RL and 2RR.

Figure 9:
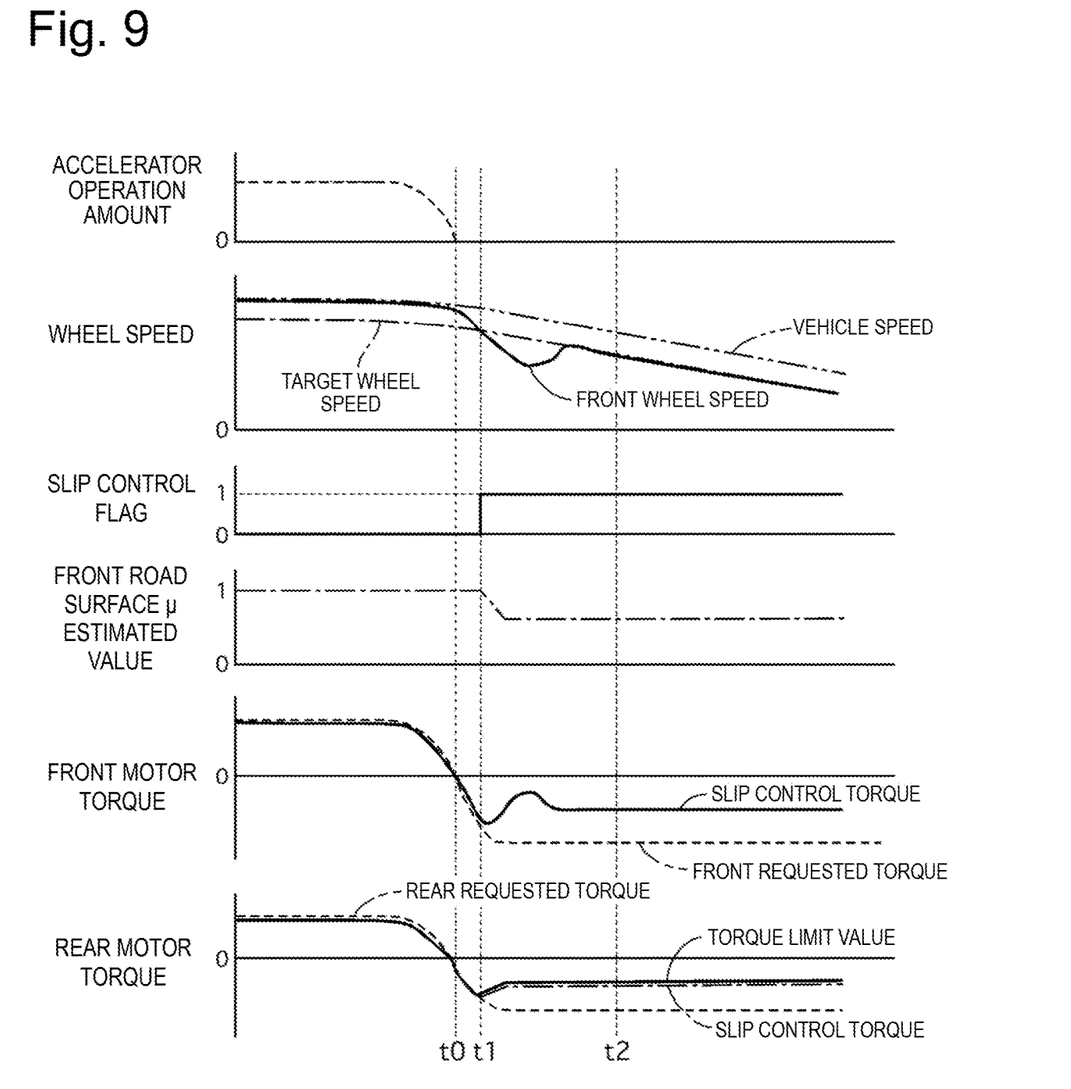
FIG. 9 is a timing chart in a case where the front wheels 2FL and 2FR have slipped when the vehicle has slowed down according to the first embodiment.

FIG. 9 is a timing chart in a case where the front wheels 2FL and 2FR have slipped when the vehicle has slowed down according to the first embodiment.

At time t0, the front wheel speed falls below the target wheel speed, so that the slip control and the torque limit control are started on the front wheels 2FL and 2FR and the rear wheels 2RL and 2RR, respectively.

At time t1, the torque limit value is determined based on the front road surface μ estimated value estimated from the slip control torque at the slip control start time (t0). During a period from time t1 to time t2, the front road surface μ estimated value estimated at the slip control start time is maintained, and therefore the limit torque determined from the front road surface μ estimated value is also kept constant.

At time t2, the predetermined time has elapsed since the slip control start time (t0) and the front motor torque is converged on the target wheel speed, so that the front road surface μ estimated value is updated based on the slip control torque at time t2. The torque limit value is also updated according to the update of the front road surface μ estimated value.

FIGS. 7 to 9 illustrate the example in which the slip control is performed on the front wheels 2FL and 2FR and the torque limit control is performed on the rear wheels 2RL and 2RR, but similar functions and effects can also be acquired when the slip control is performed on the rear wheels 2RL and 2RR and the slip control is performed on the front wheels 2FL and 2FR.

In the following description, other configurations recognizable from the above-described embodiment will be described.

In one configuration, a control apparatus for an electric vehicle including a front wheel, a front wheel electric motor configured to output a torque to the front wheel, a rear wheel, and a rear wheel electric motor configured to output a torque to the rear wheel includes a slip detection portion configured to detect a slip of each of the front wheel and the rear wheel, a target wheel slip control portion configured to perform target wheel slip control of eliminating or reducing the slip of a target wheel by controlling the torque to be output to the target wheel when setting one of the front wheel and the rear wheel where a larger slip is detected by the slip detection portion as the target wheel targeted for slip control and setting the other of the front wheel and the rear wheel as a non-target wheel, and a non-target wheel torque limit control portion configured to perform non-target wheel torque limit control of limiting the torque to be output to the non-target wheel according to the torque output to the target wheel after the target wheel slip control is started and updating a limit value of the torque to be output to the non-target wheel when a fluctuation range of the torque output to the target wheel falls within a predetermined range during the limitation.

According to a further preferable configuration, the above-described configuration further includes a non-target wheel slip control portion configured to perform non-target wheel slip control of eliminating or reducing the slip of the non-target wheel by controlling the torque to be output to the non-target wheel when the slip of the non-target wheel exceeds the slip of the target wheel after the target wheel slip control is started.

According to another preferable configuration, in any of the above-described configurations, the non-target wheel torque limit control portion sets the limit value to a smaller value than the limit value set last time when updating the limit value.

According to further another preferable configuration, any of the above-described configurations further includes a road surface µ estimated value calculation portion configured to calculate a road surface µ estimated value based on the torque output to the target wheel, and recalculate and update the road surface µ estimated value when the fluctuation range of the torque output to the target wheel falls within the predetermined range after the calculation. The non-target wheel torque limit control portion updates the limit value of the torque of the non-target wheel based on the update of the road surface µ estimated value calculated by the road surface µ estimated value calculation portion.

According to further another preferable configuration, in any of the above-described configurations, the non-target wheel torque limit control portion conducts peak-hold regarding the limit value.

According to further another preferable configuration, in any of the above-described configurations, the non-target wheel torque limit control portion makes the calculation for updating the limit value before the non-target wheel slip control portion makes the calculation for the non-target wheel slip control.

According to further another preferable configuration, in any of the above-described configurations, the target wheel is the front wheel and the non-target wheel is the rear wheel.

Further, from another view point, in one configuration, a control method for an electric vehicle including a front wheel, a front wheel electric motor configured to output a torque to the front wheel, a rear wheel, and a rear wheel electric motor configured to output a torque to the rear wheel includes a slip detection step of detecting a slip of each of the front wheel and the rear wheel; a target wheel slip control step of eliminating or reducing the slip of a target wheel by controlling the torque to be output to the target wheel when setting one of the front wheel and the rear wheel where a larger slip is detected by the slip detection step as the target wheel targeted for slip control and setting the other of the front wheel and the rear wheel as a non-target wheel; and a non-target wheel torque limit control step of performing non-target wheel torque limit control of limiting the torque to be output to the non-target wheel according to the torque output to the target wheel after the target wheel slip control step is started and updating a limit value of the torque to be output to the non-target wheel when a fluctuation range of the torque output to the target wheel falls within a predetermined range during the limitation.

Preferably, the above-described configuration further includes a non-target wheel slip control step of eliminating or reducing the slip of the non-target wheel by controlling the torque to be output to the non-target wheel when the slip of the non-target wheel exceeds the slip of the target wheel after the target wheel slip control step is started.

According to another preferable configuration, in any of the above-described configurations, the non-target wheel torque limit control step includes setting the limit value to a smaller value than the limit value set last time when updating the limit value.

According to further another preferable configuration, any of the above-described configurations further includes a road surface µ estimated value calculation step of calculating a road surface µ estimated value based on the torque output to the target wheel, and recalculating and updating the road surface µ estimated value when the fluctuation range of the torque output to the target wheel falls within the predetermined range after the calculation. The non-target wheel torque limit control step includes updating the limit value of the torque of the non-target wheel based on the update of the road surface µ estimated value calculated by the road surface µ estimated value calculation.

According to further another preferable configuration, in any of the above-described configurations, the non-target wheel torque limit control step includes conducting peak-hold regarding the limit value.

According to further another preferable configuration, in any of the above-described configurations, the non-target wheel torque limit control step includes making the calculation for updating the limit value before the non-target wheel slip control step makes the calculation for the non-target wheel slip control.

According to further another preferable configuration, in any of the above-described configurations, the target wheel is the front wheel and the non-target wheel is the rear wheel.

Further, from another view point, in one configuration, a control system for an electric vehicle includes a front wheel electric motor configured to output a torque to a front wheel of the electric vehicle, a rear wheel electric motor configured to output a torque to a rear wheel of the electric vehicle, and a control unit configured to control the front wheel electric motor and the rear wheel electric motor. The control unit includes a slip detection portion configured to detect a slip of each of the front wheel and the rear wheel, a target wheel slip control portion configured to perform target wheel slip control of eliminating or reducing the slip of a target wheel by controlling the torque to be output to the target wheel when setting one of the front wheel and the rear wheel where a larger slip is detected by the slip detection portion as the target wheel targeted for slip control and setting the other of the front wheel and the rear wheel as a non-target wheel, and a non-target wheel torque limit control portion configured to perform non-target wheel torque limit control of limiting the torque to be output to the non-target wheel according to the torque output to the target wheel after the target wheel slip control is started and updating a limit value of the torque to be output to the non-target wheel when a fluctuation range of the torque output to the target wheel falls within a predetermined range during the limitation.

Having described several embodiments of the present invention, the above-described embodiments of the present invention are intended to only facilitate the understanding of the present invention, and are not intended to limit the present invention thereto. The present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

The present application claims priority to Japanese Patent Application No. 2016-185106 filed on Sep. 23, 2016. The entire disclosure of Japanese Patent Application No. 2016-185106 filed on Sep. 23, 2016 including the specification, the claims, the drawings, and the abstract is incorporated herein by reference in its entirety.

REFERENCE SIGN LIST 1 electric vehicle
2FL, 2FR front wheel (front-side wheel)
2RL, 2RR rear wheel (rear-side wheel)
3 front motor (front wheel electric motor)
7 rear motor (rear wheel electric motor)
17 vehicle control apparatus (control unit)
22 road surface µ estimation processing portion (road surface µ estimated value calculation portion)
23 torque limit value calculation processing portion (non-target wheel torque limit control portion)
24 slip control torque calculation processing portion (target wheel slip control portion and non-target wheel slip control portion)
24a slip detection portion

The invention claimed is:

1. A control apparatus for an electric vehicle including front wheels, a front wheel electric motor configured to output a torque to the front wheels, rear wheels, and a rear wheel electric motor configured to output a torque to the rear wheels, the control apparatus comprising:
a slip detection portion configured to detect a slip of each of the front wheels and the rear wheels;
a target wheel slip control portion configured to perform target wheel slip control of eliminating or reducing the slip of target wheels by controlling the torque to be output to the target wheels when setting one of the front wheels and the rear wheels where a larger slip is detected by the slip detection portion as the target wheels targeted for slip control and setting the other of the front wheels and the rear wheels as non-target wheels;
a non-target wheel torque limit control portion configured to perform non-target wheel torque limit control of limiting the torque to be output to the non-target wheels according to the torque output to the target wheels and a road surface µ estimated value of the non-target wheels after the target wheel slip control is started, and updating a limit value of the torque to be output to the non-target wheels when a fluctuation range of the torque output to the target wheels falls within a predetermined range during the limitation; and
a road surface µ estimated value calculation portion configured to: i) calculate the road surface µ estimated value of the non-target wheels based on the torque output to the target wheels, and ii) recalculate and update the road surface µ estimated value of the non-target wheels when the fluctuation range of the torque output to the target wheels falls within the predetermined range after the calculation, wherein
the non-target wheel torque limit control portion updates the limit value of the torque of the non-target wheels based on the update of the road surface µ estimated value of the non-target wheels calculated by the road surface µ estimated value calculation portion.

2. The control apparatus for the electric vehicle according to claim 1, further comprising a non-target wheel slip control portion configured to perform non-target wheel slip control of eliminating or reducing the slip of the non-target wheels by controlling the torque to be output to the non-target wheels when the slip of the non-target wheels exceeds the slip of the target wheels after the target wheel slip control is started.

3. The control apparatus for the electric vehicle according to claim 1, wherein the non-target wheel torque limit control portion conducts peak-hold regarding the limit value.

4. The control apparatus for the electric vehicle according to claim 1, wherein the target wheels are the front wheels and the non-target wheels are the rear wheels.

5. A control method for an electric vehicle including front wheels, a front wheel electric motor configured to output a torque to the front wheels, rear wheels, and a rear wheel electric motor configured to output a torque to the rear wheels, the control method comprising:
a slip detection step of detecting a slip of each of the front wheels and the rear wheels;
a target wheel slip control step of eliminating or reducing the slip of target wheels by controlling the torque to be output to the target wheels when setting one of the front wheels and the rear wheels where a larger slip is detected by the slip detection step as the target wheels targeted for slip control and setting the other of the front wheels and the rear wheels as non-target wheels;
a non-target wheel torque limit control step of performing non-target wheel torque limit control of limiting the torque to be output to the non-target wheels according to the torque output to the target wheels and a road surface µ estimated value of the non-target wheels after the target wheel slip control step is started, and updating a limit value of the torque to be output to the non-target wheels when a fluctuation range of the torque output to the target wheels falls within a predetermined range during the limitation;
a road surface µ estimated value calculation step of calculating a road surface µ estimated value of the non-target wheels based on the torque output to the target wheels; and
a recalculating and updating step of recalculating and updating the road surface µ estimated value of the non-target wheels when the fluctuation range of the torque output to the target wheels falls within the predetermined range after the calculation, wherein
the non-target wheel torque limit control step includes updating the limit value of the torque of the non-target wheels based on the update of the road surface µ estimated value of the non-target wheels calculated by the road surface µ estimated value calculation.

6. The control method for the electric vehicle according to claim 5, further comprising a non-target wheel slip control step of eliminating or reducing the slip of the non-target wheels by controlling the torque to be output to the non-target wheels when the slip of the non-target wheels exceeds the slip of the target wheels after the target wheel slip control step is started.

7. The control method for the electric vehicle according to claim 5, wherein the non-target wheel torque limit control step includes conducting peak-hold regarding the limit value.

8. The control method for the electric vehicle according to claim 5, wherein the target wheels are the front wheels and the non-target wheels are the rear wheels.

9. A control system for an electric vehicle comprising:
a front wheel electric motor configured to output a torque to front wheels of the electric vehicle;
a rear wheel electric motor configured to output a torque to rear wheels of the electric vehicle; and
a control unit configured to control the front wheel electric motor and the rear wheel electric motor,
wherein the control unit includes
a slip detection portion configured to detect a slip of each of the front wheels and the rear wheels,
a target wheel slip control portion configured to perform target wheel slip control of eliminating or reducing the slip of target wheels by controlling the torque to be output to the target wheels when setting one of the front wheels and the rear wheels where a larger slip is detected by the slip detection portion as the target wheels targeted for slip control and setting the other of the front wheels and the rear wheels as non-target wheels,
a non-target wheel torque limit control portion configured to perform non-target wheel torque limit control of limiting the torque to be output to the non-target wheels according to the torque output to the target wheels and a road surface $\mu$ estimated value of the non-target wheels after the target wheel slip control is started, and updating a limit value of the torque to be output to the non-target wheels when a fluctuation range of the torque output to the target wheels falls within a predetermined range during limitation, and
a road surface $\mu$ estimated value calculation portion configured to: i) calculate the road surface $\mu$ estimated value of the non-target wheels based on the torque output to the target wheels, and ii) recalculate and update the road surface $\mu$ estimated value of the non-target wheels when the fluctuation range of the torque output to the target wheels falls within the predetermined range after the calculation, wherein
the non-target wheel torque limit control portion updates the limit value of the torque of the non-target wheels based on the update of the road surface $\mu$ estimated value of the non-target wheels calculated by the road surface $\mu$ estimated value calculation portion.

* * * * *